US006463629B1

(12) United States Patent
Niccolai

(10) Patent No.: US 6,463,629 B1
(45) Date of Patent: Oct. 15, 2002

(54) ROD HANDLE WITH A PROTECTIVE COAT

(76) Inventor: Celestino Niccolai, Via Giamcomo Matteotti 94, 51036 Larciano (PT) (IT)

(*) Notice: Subject to any disclaimer, the term of this patent is extended or adjusted under 35 U.S.C. 154(b) by 0 days.

(21) Appl. No.: 09/137,644

(22) Filed: Aug. 20, 1998

(30) Foreign Application Priority Data

Aug. 22, 1997 (IT) .......................................... F197A203
Aug. 22, 1997 (IT) .......................................... F197115 U

(51) Int. Cl.[7] .............................. B25G 3/00; A47J 45/00

(52) U.S. Cl. .......................... 16/431; 16/110.1; 16/436; 16/421; 16/DIG. 12; 16/430

(58) Field of Search .......................... 16/431, 430, 421, 16/436, DIG. 12, DIG. 18, DIG. 19; 81/436, 489, 177.1, 900, 116 R

(56) References Cited

U.S. PATENT DOCUMENTS

| | | | | | |
|---|---|---|---|---|---|
| 1,942,493 | A | * | 1/1934 | Reith | 16/431 |
| 2,276,725 | A | * | 3/1942 | Huffman | 16/431 |
| 2,604,661 | A | | 7/1952 | Karns | |
| 2,635,280 | A | * | 4/1953 | Baca | 16/431 |
| 3,259,680 | A | | 7/1966 | Schelke | |
| 3,762,453 | A | | 10/1973 | Merrow et al. | |
| 4,261,567 | A | * | 4/1981 | Uffindell | 264/45.1 |
| 4,570,988 | A | * | 2/1986 | Carmien | 16/110.1 |
| 4,951,533 | A | * | 8/1990 | Hillinger | 81/177.1 |
| 5,083,780 | A | * | 1/1992 | Walton et al. | 273/80 B |
| 5,107,590 | A | * | 4/1992 | Burout, III et al. | 30/85 |
| 5,261,665 | A | * | 11/1993 | Downey | 16/DIG. 12 |
| 5,290,063 | A | * | 3/1994 | Lenhart | 16/DIG. 12 |
| 5,740,586 | A | * | 4/1998 | Gomas | 16/DIG. 12 |

FOREIGN PATENT DOCUMENTS

| | | |
|---|---|---|
| DE | 44 30 738 | 5/1995 |

* cited by examiner

*Primary Examiner*—Chuck Y. Mah
(74) *Attorney, Agent, or Firm*—Cohen, Pontani, Lieberman & Pavane

(57) ABSTRACT

A coated rod-like handle, and an apparatus and method of molding a protective coat on a portion of a rod-like handle. The method includes the steps of: (1) providing a mold having at least one projection extending radially inwardly from an inside wall of the mold and so positioned and configured to support the portion of the rod-like handle placed concentrically inside the mold and to prevent the said portion of the rod-like handle from deforming laterally during an injection molding cycle; and (2) injecting a molding material under pressure through an inlet in the mold so as to form a protective coat on and about the said portion of the rod-like handle.

5 Claims, 4 Drawing Sheets

ROD HANDLE WITH A PROTECTIVE COAT

BACKGROUND OF THE INVENTION

1. Field of the Invention

The present invention relates to a rod handle and to a process and an apparatus for providing a protective cover on a rod-like structure, more particularly an injection molding process and apparatus for applying a protective coat on a handle portion of a broomstick or the like.

2. Description of the Related Art

It is often desirable to provide a resilient and smooth protective cover over the handle portion of a broomstick or the like so as to make handling of the item more comfortable. Numerous protective covers for broomsticks are available on the market today. Some of these covers are produced by injecting a two-component polyurethane into a mold containing the handle portion of the broomstick. The injected polyurethane components then react and bond with each other to form a protective coat over the broomstick portion. The cured polyurethane is characterized by an open or close-celled structure.

This production technique is rarely used by the industry because the bond-forming process is slow as it takes a long time to cure and deposit the desired thickness of the two component polyurethane over the broomstick portion. Other disadvantages associated with this method are: (1) the high cost of the raw materials, and (2) the polyurethane has a low level of resistance to wear and tear, due to its cell-type structure.

Another production technique for producing a protective cover for the handle or grip area requires the manufacture of a thin tubular sleeve and then fitting the sleeve over the grip area of the broomstick. This technique is also expensive and, over an extended period of use, the sleeve becomes loose and sloppy.

SUMMARY OF THE INVENTION

An object of the present invention is accordingly to provide a low-cost method and an apparatus for producing a durable protective coat for a handle portion of a rod-like structure such, for example, as a broomstick without the aforementioned disadvantages, and to provide a rod handle in accordance therewith.

In one embodiment of the present invention, the process includes the steps of: (1) placing the rod-like handle concentrically within a cavity of a mold with projections extending from an inside wall of the mold and toward the rod-like handle, and (2) injecting a thermoplastic resin such, for example, as polypropylene, thermoplastic synthetic rubber or the like into the mold. Advantageously, the projections serve as breaking points to counteract forces imparted during the injection cycle, so as to avoid deforming the rod-like handle.

In another embodiment of the present invention, one end of the handle is placed inside the mold wherein the injected material settles, surrounds and bonds to said one end of the handle. Where the handle is constructed from tubular pipe, a disposable stopper is positioned at the opening of said one end so as to prevent the injected material from flowing through the opening and into the pipe.

In still another embodiment, the handle is inserted into the cavity of the mold such that the two ends of the mold hold the handle in position.

According to one particular aspect of the invention, the mold is configured to surround a rod-like handle having a substantially circular cross section. The mold has a plane of symmetry along a center plane of the rod handle and is formed of two identical half-portions separated by the plane of symmetry. The mold is constructed so as to permit at least one end of the rod to extend outside of the mold.

The mold has stud-like radially-defined projections disposed at selected distances along the longitudinal direction of the handle. These projections are so shaped and positioned to prevent undercuts and spaced from each other so as to ensure free flowing and uniform distribution of the injected material.

The projections are disposed circumferentially around an inside wall of the mold. The inside wall of the mold may further include raised and/or recessed surfaces shaped and arranged in such a way as to form decorations and/or inscriptions on the to-be-molded protective coat. These surfaces may be dimensioned to extend radially inwardly and engage the surface of the handle placed in the mold so as to form grooves in the protective coat to thereby allow visual inspection of the handle surface.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar or corresponding elements throughout the several views.

DETAILED DESCRIPTION OF THE CURRENTLY PREFERRED EMBODIMENTS

Figure 7:
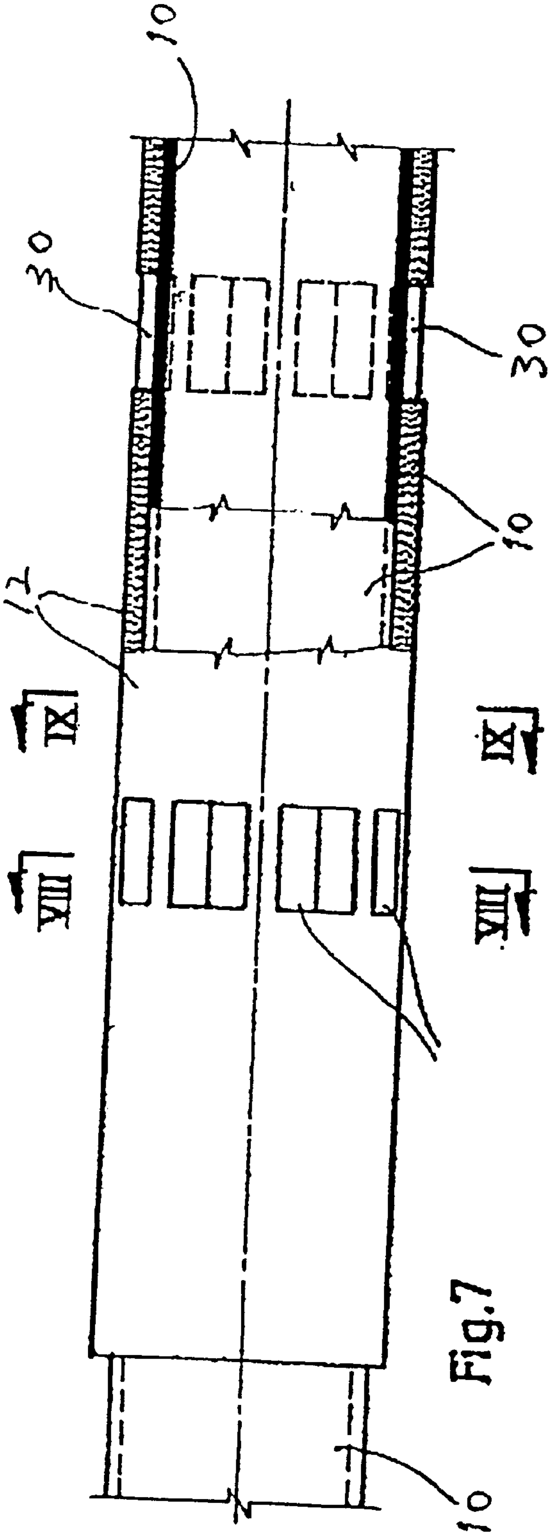
FIG. 7 is a partial sectional view of a rod handle with a protective coat molded thereon in accordance with the present invention.
Figure 9:
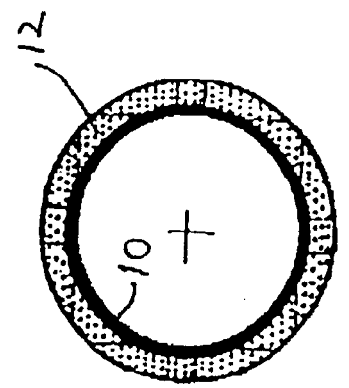
FIG. 9 is a transverse sectional view of the rod handle along the line IX—IX in FIG. 7.
Figure 8:
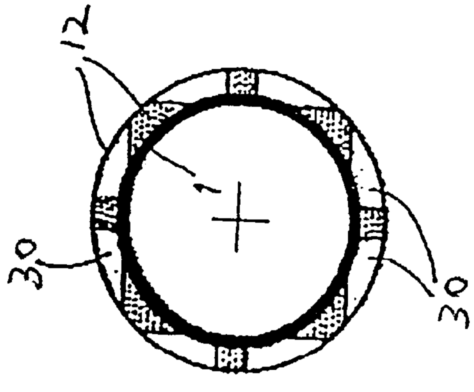
FIG. 8 is a transverse sectional view of the rod handle along the line VIII—VIII in FIG. 7.

Referring now to the drawings, and in particular FIGS. 7–9, there is shown a rod-like handle 10 having a protective coat 12 applied thereon in accordance with the present invention. The handle 10 is preferably substantially tubular or cylindrical in shape and made of metal, although it is also contemplated that the rod handle 1 may be formed of other materials such, for example, as wood or other wood-based materials. Properly designed, a metallic rod is typically stronger and lighter than a wooden rod. A metallic rod intended for manual use should be light and relatively long for ease of handling, as well as inexpensive to manufacture. It is currently preferred that the rod-like handle 10 be constructed from a metal pipe with a thin wall.

Although the prior art process of making protective coats in situ using expanded or reticulated polyurethane (obtained from a chemical reaction of the bi-component materials) does not impart significant deformation forces on the handle 10, the protective cover produced by that process is expensive to utilize because the chemical reaction time for bonding the two components is long and the cost of acquiring the bi-component materials is very high.

In contrast, an injection molding process will achieve significant time saving; however, such a process will impart considerable lateral or transverse loads on the rod-like handle regardless of whether the handle is made of metal or wood. The handle will experience significant lateral deformations and may even sustain permanent deformations under these loads.

In accordance with the present invention, a high pressure injection molding process utilizes thermoplastic materials such, for example, as polypropylene, thermoplastic synthetic rubber or other equivalent materials. The protective coat is preferably applied continuously or at discrete positions along a relatively long or continuous span of the rod so as to enable a user to maintain a good grip on the handle 10.

Figure 1:
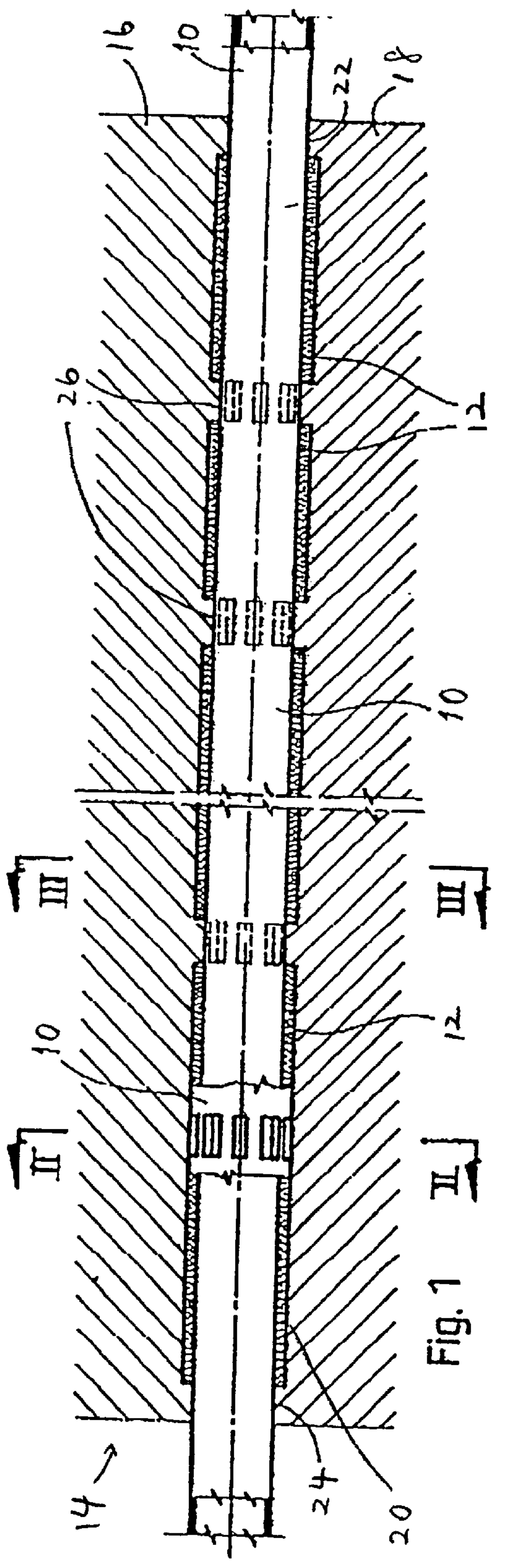
FIG. 1 is a longitudinal sectional view of a mold constructed in accordance with the present invention with a handle portion of a rod disposed therein.
Figure 3:
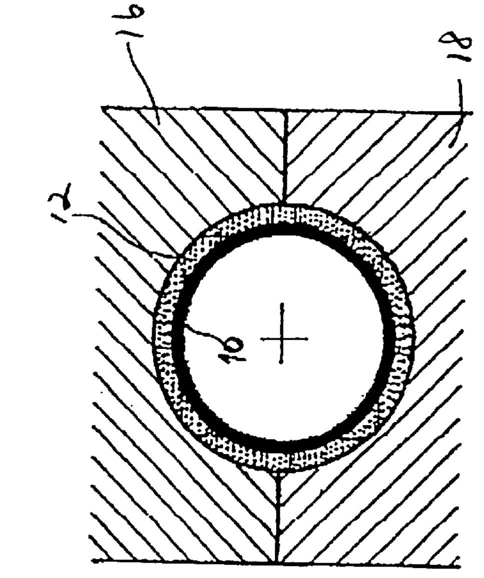
FIG. 3 is a transverse sectional view of the handle along the line III—III in FIG. 1.
Figure 2:
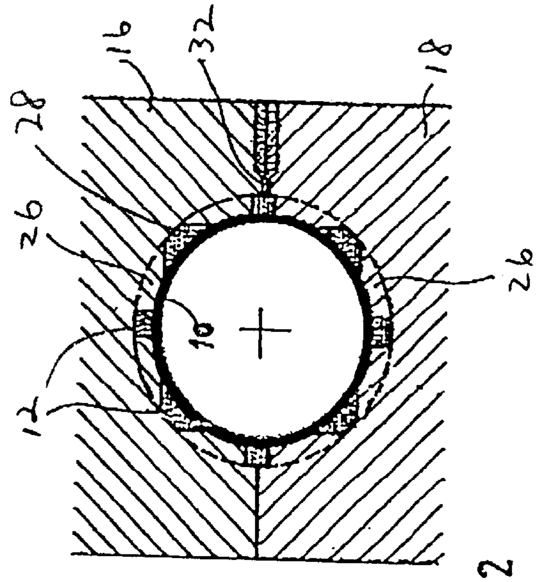
FIG. 2 is a transverse sectional view of the handle along the line II—II in FIG. 1.

In order to apply a protective coat 12 to the rod handle 10, it is necessary in accordance with the invention to pre-arrange the handle 10 within a mold 14, as for example depicted in FIGS. 1–3. The mold 14 is preferably formed of two half-portions 16, 18 and has a longitudinal cavity 20 configured for defining the external shape of the protective coat 12. The handle 10 is inserted inside the longitudinal cavity 20, and is supported at the two opposite ends 22, 24 of the longitudinal cavity 20. Alternatively, the mold cavity 20 can be configured in a stepwise manner, as where the protective coat 12 is to be applied to an end of the handle 10, as for example shown in FIGS. 10 and 11.

During an injection cycle, the rod handle 10 will be subjected to strong transverse or lateral pressure thrusts from the injected molding material, regardless of how many injection nozzles are used or how they are arranged. Furthermore, since the injected material will cool down very rapidly, it will be necessary to inject the material at much higher pressure than is typically required. As a result, and by virtue of the increased pressure thrusts, the handle 10 set in the mold cavity 20 will also experience a higher level of stresses.

To ensure that the handle 10 will not sustain significant side-to-side distortions or deformations during the injection cycle, the mold 14 is advantageously constructed with a plurality of projections 26 extending radially inward from an inside wall that defines or bounds the mold cavity 20. Preferably, the projections 26 are configured and dimensioned to provide such lateral support to the handle 10 placed therein during the injection cycle so as to prevent the handle 10 from experiencing permanent deformations. Preferably, the projections 26 are positioned at selected distances or intervals along the length of the handle 10 so as to provide lateral support thereof. Furthermore, at each interval, the projections 26 are distributed concentrically about the handle and spaced from each other so as to form gaps 28 therebetween. These gaps 28 advantageously permit the injected material to flow through the gaps and along the length of the mold 14 during the injection cycle. The projections 26 also define break points for the injected molding material as it flows between the opposite ends 22 and 24 of the mold 14 during the injection cycle.

Figure 10:
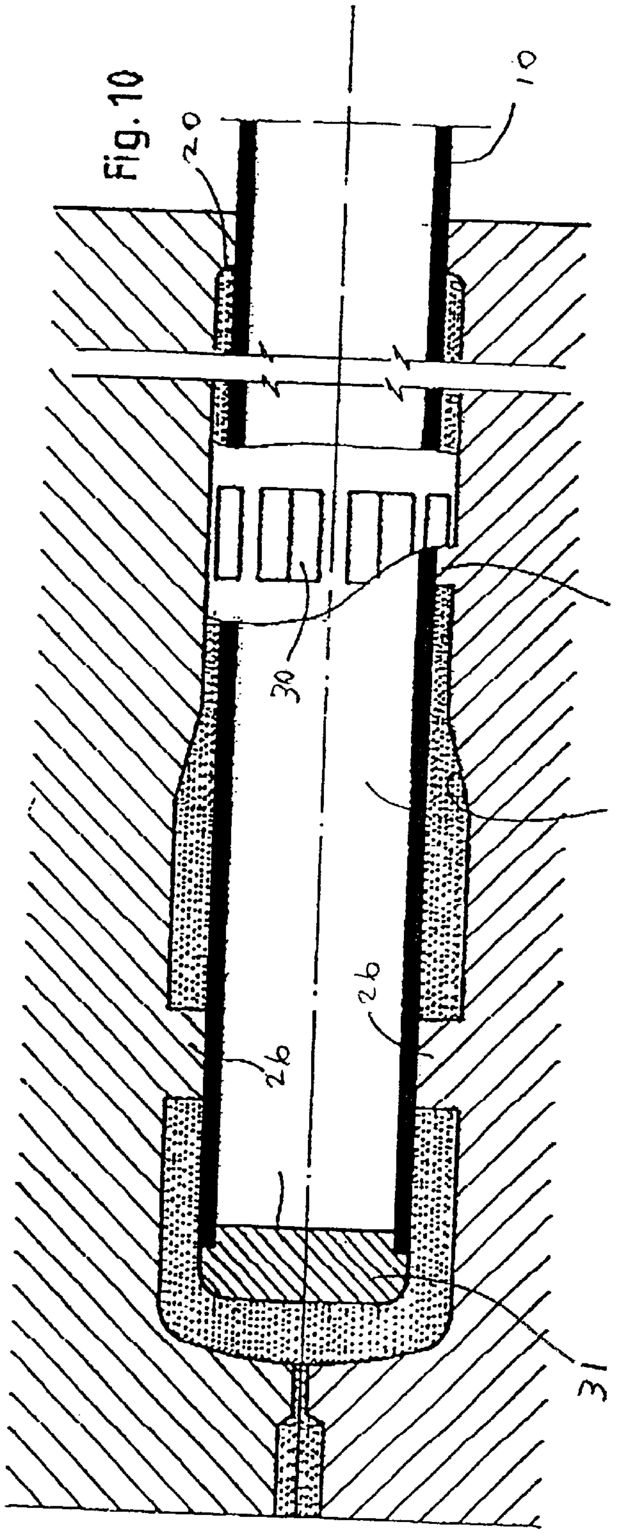
FIG. 10 is a longitudinal sectional view of one end of a rod handle set in another embodiment of the mold of the present invention.
Figure 11:
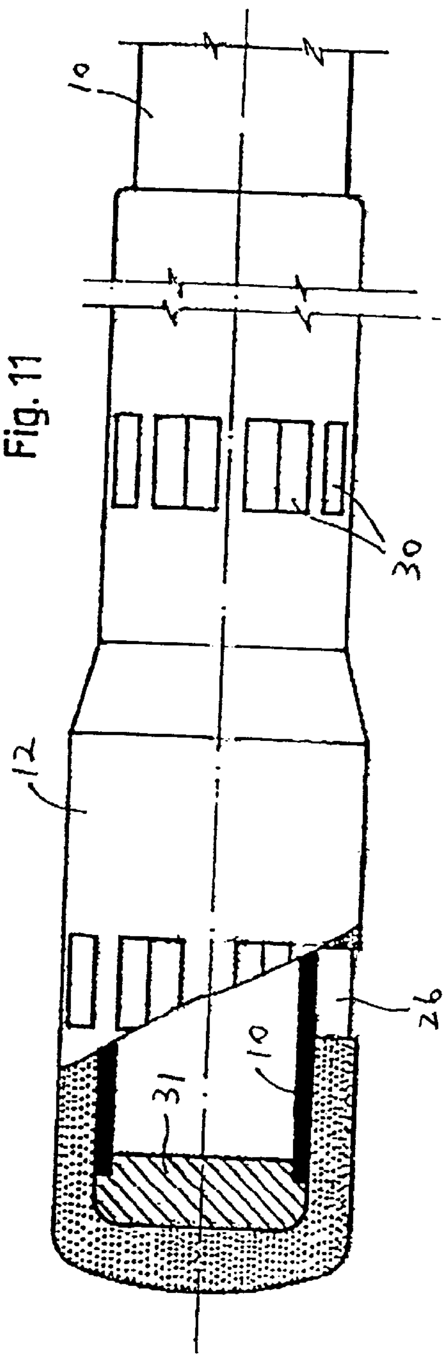
FIG. 11 is a partial sectional view of the handle of FIG. 10.

FIGS. 10 and 11 illustrate that where the protective coat 12 is to be molded about one end of the handle 10, the projections 26 are positioned proximate that end of handle 10 so as to provide adequate structural support for the overhanging handle.

Advantageously, and irrespective of the exact arrangement, the projections 26 form appropriate break points which ensure that the handle 10 is correctly positioned and stably supported in the mold 14, even if the projections 26 are located at relatively narrowly spaced intervals. Firmly held in the cavity 20 of mold 14 by the narrowly spaced projections 26, the handle 10 is grouped with sufficiently rigidity to withstand distortion-inducing lateral stresses resulting from the high pressures of the injected thermoplastic material.

As shown in FIGS. 10 and 11, a handle 10 having an open end should preferably be provided with a disposable stopper or cap 31 positioned at and closing the open end so as to prevent the injected material from flowing into the open end. The stopper 31 is subjected to the thrusts of the injected material which is introduced at high pressure to ensure that the protective coat 12 will be uniformly and flawlessly molded over and about the rod handle 10.

The projections 26 can be arranged so as to provide appropriate supports at regular intervals for the handle 10 and to allow a free flow of the injected material through the gaps 28 formed between adjacent projections 26. The gaps 28 are preferably dimensioned to be narrow and thin to thereby produce a sleeved handle 10 that is easy to hold, lightweight and inexpensive to manufacture and purchase.

Figure 6:
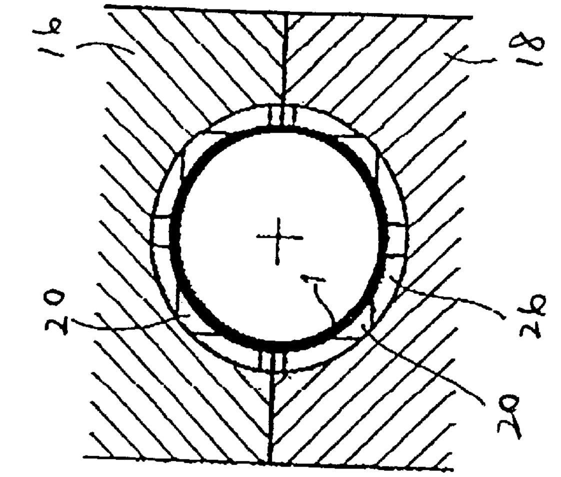
FIG. 6 is a sectional view of the mold along the line III—III in FIG. 1 prior to the injection of molding material.
Figure 5:
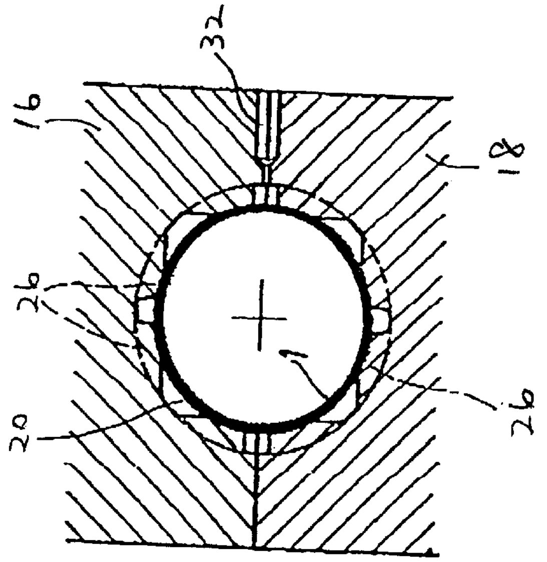
FIG. 5 is a sectional view of the mold in FIG. 4 after assembly thereof.
Figure 4:
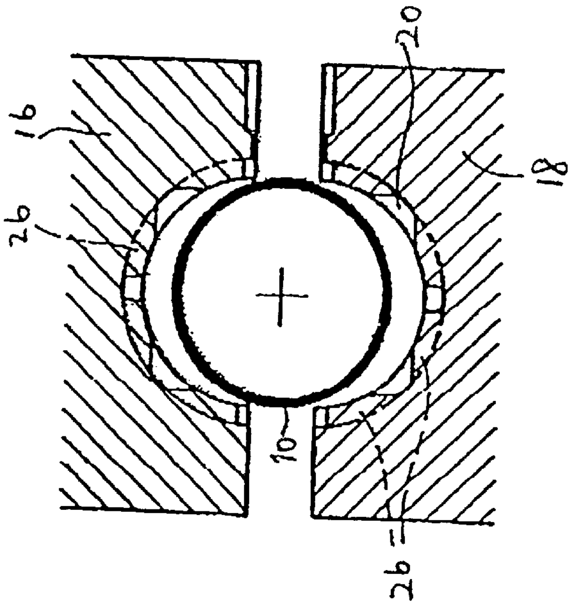
FIG. 4 is a sectional view of the two half-portions of the mold along the line II—II in FIG. 1 prior to assembly thereof.

As can be seen in the sectional views of FIGS. 4–6, the projections 26 are preferably arranged along the circumference of the inside wall of the mold 14 and are sufficiently spaced from each other so as to ensure adequate flow of the injected material in and along the longitudinal extension or direction of the handle 10. The projections 26 should also be arranged so as to allow ready removal of the mold 14 from about the handle at the end of the molding process. Due to the engagement of the projections 26 with the handle surface, the protective coat 12 will have grooves 30 formed therein and which can be viewed as decorative details, as for example illustrated in FIGS. 7 and 8.

FIGS. 2 and 5 illustrate that the injection nozzles 32 may by way of example be located in either of the half-portions 16, 18 of the mold 14, along the joining plane of the mold, and/or proximate the joining region of the half-portions 16, 18.

Regardless of the material of the handle 10 (e.g. metal or wood) or the surface finish of the handle (e.g. varnished or unvarnished), the protective coat 12 produced thereon in accordance with the present invention will firmly adhere to the handle 10. This is because the preferred molding material—such, for example, as polypropylene, thermoplastic rubber, or an equivalent compound—shrinks or otherwise contracts immediately following the injection cycle as it cools. Such encircling adherence of the protective coat 12 to the handle 10 yields sufficient contact pressure on the handle surface to ensure that the protective coat 12 will be permanently secured, or otherwise firmly adhere, to the handle 10. This important feature prevents separation or slipping of the coat 12 along the surface of the handle 10, even after an extended period of use, as commonly occur with other types of protective handle covers available in the marketplace.

The preferred final thickness of the protective coat about the handle 10 is between about 2.0 and 2.5 mm (millimeters). A thickness of approximately 2.2 mm was found to be most acceptable. A lesser thickness may create numerous problems because the injected material flowing through the annular spaces between the handle 10 and mold 14 cannot be permitted to cool down too quickly. On the other hand, the temperature of the injected molding material cannot be too high because the surface of the handle 10 would otherwise be damaged by higher temperatures of the injected material, particularly if the handle surface has a finish coat that is intended to be visible through the grooves 30 of the protective coat 12—created by the projections 26 of the mold 10 in the molding process. These grooves 30 may be configured and arranged so as to embellish the handle 10 and thereby create an appropriate marking. Furthermore, the protective coat 12 may be inscribed with patterns that enhance the appearance of the handle without interfering with a user's ability to readily grip the handle 10.

While there have been shown and described and pointed out fundamental novel features of the present invention as applied to preferred embodiments thereof, it will be understood that various omissions and substitutions and changes in the methods described and in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A protective handle comprising:

a grip formed of a thermoplastic material disposed on an end portion of an elongated rod and attached to the outer surface of the rod to define a gripping surface, said grip containing a plurality of elongated grooves extending along the rod elongation and spaced from each other circumferentially about the rod outer surface, each said groove containing at least one opening extending radially-inwardly from the gripping surface at an outer edge of said groove to the elongated rod outer surface so that portions of the end portion of the elongated rod at the openings are exposed to an air-filled environment containing the protective handle.

2. A protective handle according to claim 1, wherein said rod end has an axial opening closed off by a stopper received in said opening, and wherein said thermoplastic material covers said stopper.

3. A protective handle according to claim 1, wherein said grooves are arranged in decorative patterns.

4. A protective handle according to claim 1, wherein said rod is one of metal and wood.

5. The protective handle according to claim 1, wherein said grip is formed by molding the thermoplastic material to the end portion of the elongated rod.

* * * * *